(12) United States Patent
Daniel et al.

(10) Patent No.: US 7,802,258 B2
(45) Date of Patent: Sep. 21, 2010

(54) INTERFACE BETWEEN COMPUTER SOFTWARE MODULES

(75) Inventors: Jérome Daniel, Grasse (FR); Paul Thierry, Nice (FR)

(73) Assignee: Amadeus S.A.S., Sophia Antipolis (FR)

(*) Notice: Subject to any disclaimer, the term of this patent is extended or adjusted under 35 U.S.C. 154(b) by 858 days.

(21) Appl. No.: 11/705,652

(22) Filed: Feb. 13, 2007

(65) Prior Publication Data

US 2008/0196048 A1    Aug. 14, 2008

(51) Int. Cl.
*G06F 9/46* (2006.01)

(52) U.S. Cl. .................. 718/105; 709/201; 709/203

(58) Field of Classification Search .............. 718/105; 709/201, 203
See application file for complete search history.

(56) References Cited

U.S. PATENT DOCUMENTS

| | | | |
|---|---|---|---|
| 7,509,407 B2* | 3/2009 | Miller et al. | 709/223 |
| 7,512,949 B2* | 3/2009 | Creamer et al. | 718/105 |
| 7,657,638 B2* | 2/2010 | Deen et al. | 709/229 |
| 2001/0010053 A1* | 7/2001 | Ben-Shachar et al. | 709/105 |
| 2003/0187851 A1 | 10/2003 | Fay et al. | |
| 2006/0100914 A1 | 5/2006 | Jafri et al. | |
| 2008/0059972 A1* | 3/2008 | Ding et al. | 718/105 |

OTHER PUBLICATIONS

Rosenberg F, et al. "Design and Implementation of a Service-Oriented Business Rules Broker", XP010843475-Abstract p. 4, line 10-p. 6, line 4, Figs. 1,2, 2005.

Jong-Soo Kim, et al. "The Study of the APIs design in the Internet application to construct a database server", XP010829659-Abstract p. 337, line 1-p. 338, line 9, Fig., 2005.

William R Cook, et al. "Web Services versus Distributed Objects: A Case Study of Performance and Interface Design", XP031031583-Abstract p. 5,-line 6-line 47, 2006.

Wydaeghe B, et al. "Building an OMT—editor using design patterns: an experience report", XP010299361-p. 28, line 21-p. 29, line 5, 1998.

Clark D I, et al. "Application level user interfaces for various media", XP010364805-p. 21, line 4-p. 26, line 3, 1999.

Quiane Ruiz J A, et al. "Design of a voiceXML gateway", XP010658558-p. 2, line 10-p. 4, line 14, 2003.

Llambiri D, et al. "Efficiently distributing component-based applications across wide-area environments", XP010642311-p. 4, line 22-p. 5, line 19, 2003.

* cited by examiner

*Primary Examiner*—Andy Ho
(74) *Attorney, Agent, or Firm*—Drinker Biddle & Reath LLP

(57) ABSTRACT

An interface module between a communication module and a number of instances of business logic modules of a software engine comprises first and second functional elements. The first functional element receives incoming data from the communications module and selects which of the instances of business logic modules to forward the incoming data based upon a rule set held within a data structure at the first functional element. The incoming data passes to the selected logic module instance via the second functional element. The second functional element determines either a single shot or a multiple shot mode of operation. If a multiple shot mode of operation is selected incoming data passes to the selected logic module instance sequentially. Alternatively, if a single shot mode of operation is selected a summary data record corresponding summary of incoming data received at the first function element passes to the selected logic module instance.

13 Claims, 2 Drawing Sheets

INTERFACE BETWEEN COMPUTER SOFTWARE MODULES

FIELD OF THE INVENTION

This invention relates to an interface module. More particularly, but not exclusively, it relates to an interface module between modules of software. Even more particularly, but not exclusively, it relates to an interface module between a module of communications software and a module of business logic software.

BACKGROUND TO THE INVENTION

Typically, a business software engine comprises a front end communications module and a plurality of instances of back end business logic modules. During the interrogation of the business engine in response to a user query the front end module receives query data corresponding to the user query. The front end module then determines which of the back end modules is most suitable to deal with the user query. Typically, this determination is made based upon criteria such as which back end modules are running the appropriate business logic and the load that a particular back end is subject to at the time of receipt of the user query.

The back end module the processes the query data and formulates interrogation data for the interrogation of external servers where appropriate. This interrogation data passes to the front end module from where it is routed to appropriate external servers. Typically, processing of data by the back end module is suspended until a reply is received from the external servers to the interrogation data.

Replies from the external servers are routed to the suspended back end module via the front end module. Data processing recommences at the suspended back end module and data from the replies is incorporated into a response. The response is output to the user via the front end module.

Such an arrangement does not result in an efficient use of resources as each instance of a back end module can process only a single request. This is because the processing at each back end module is suspended until replies are received to the interrogation data from the external servers.

Attempts to deal with replies asynchronously can result in the corruption of data within the back end module as data is written and read simultaneously from a back end module.

SUMMARY OF THE INVENTION

According to a first aspect of the present invention there is provided an interface module comprising first and second functional elements, the first functional element being arranged to receive incoming data from a communications module and to select which of a plurality of instances of logic modules to forward the incoming data to based upon a rule set held within a data structure, and being further arranged to pass the incoming data to the selected logic module instance via the second functional element, characterised by the second functional element being arranged to determine a mode of operation of the selected logic module instance and to mediate the passage of data between the selected logic module instance and the first functional element, and the first functional element being arranged to pass incoming data to the second functional element sequentially or to pass data corresponding to a summary data record corresponding summary of incoming data received to the second functional element dependent upon the mode of operation of the selected logic module.

Such a module prevents the corruption of data within the logic module as data is neither written to, nor read from, the logic module simultaneously.

The first functional element may be associated with the communications module. The second functional element may be associated with the logic module. There may be a plurality of second functional elements each associated with an instance of a logic module.

Such a division of the functional elements of the interface allows specific functionality to be associated with the modules with which they interact resulting in each logic module independently. This increases redundancy within the system as a second functional element can fail without prejudicing the operation of the remaining instances of logic modules.

The data structure may comprise data entries corresponding to the rules. The data structure may be stored at the first functional element.

The first functional element may be arranged to receive incoming query data from a remote terminal and may be further arranged to assign which of the plurality of logic modules to pass the query data to dependent upon rules. The rules may comprise any one, or combination of the following: suitability of a given logic module, usage of a given logic module, operational status of a given logic module.

The first functional element regulates the flow of data to and from instances of the logic modules such that the efficient usage of the logic modules is achieved. This thereby increases the efficiency of operation of a processor running the logic modules.

The first functional element may be arranged to interrogate external servers in response to request data received from one of the plurality of logic modules via the second functional elements. The first functional element may be arranged to store response data from the external servers and may be further arranged to generate the summary data record therefrom. Alternatively, the first functional element may be arranged to pass the response data to the logic module sequentially.

This allows multiple instances of the response data from an external database to be managed so as to reduce the likelihood of data corruption.

The interface may comprise a context data structure. The context data structure may comprise data entries corresponding any one, or combination, of the following: assignment of logic modules to query data, global time out parameter associated with an instance of query data, session identifier (SID) associated with each instance of query data, a specific response time out associated with an instance of interrogation of an external server. The context data structure may be stored within the first functional element.

The context data structure allows the management of query data to be carried out in such a way that instances of logic modules can be freed to process different query data whilst remote servers are being interrogated.

The first functional element may be arranged to return a timeout datum to the second functional element in the time elapsed between interrogating an external server and receiving response data from the external server exceeds a predetermined timeout threshold.

According to a second aspect of the present invention there is provided software which when executed upon a processor causes the processor to act as the interface of the first aspect of the present invention.

According to a third aspect of the present invention there is provided method of interfacing between a communications module and instances of logic modules comprising the steps of:

selecting which of a plurality of instances of logic modules to forward the incoming data to based upon a rule set held within a data structure;

passing incoming data to the selected logic module instance; characterised by determining a mode of operation of the selected logic module instance; and passing either incoming data received at the communications module sequentially, or data corresponding to a summary data record corresponding to a summary of incoming data received at the communications module, dependent upon the mode of operation of the selected logic module instance.

BRIEF DESCRIPTION OF THE DRAWINGS

Embodiments of the present invention will now be described, by way of example only, with reference to the accompanying drawings, in which.

DETAILED DESCRIPTION OF EMBODIMENTS OF THE INVENTION

Figure 1:
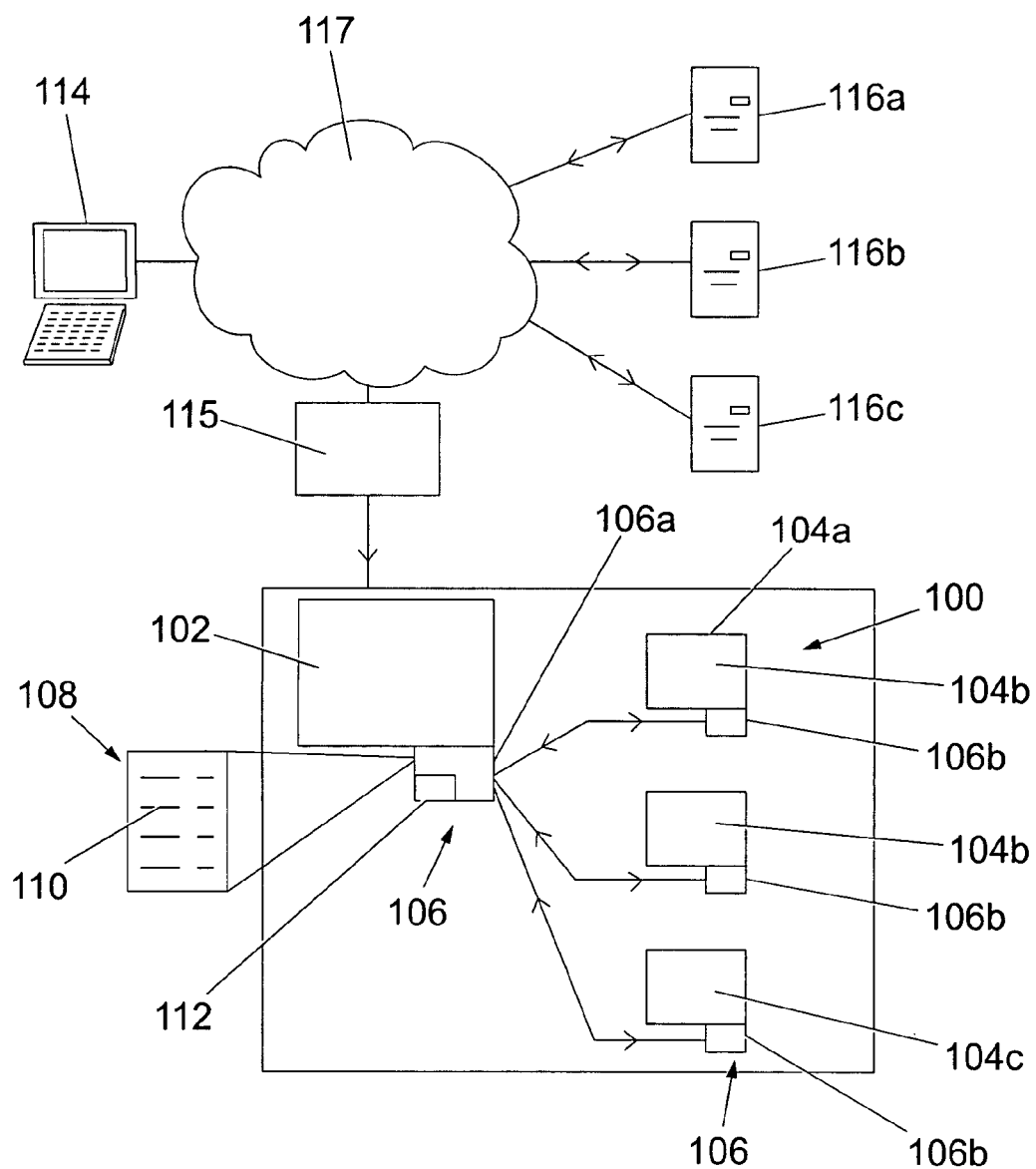
FIG. 1 is a schematic diagram of a business engine comprising a business software engine comprising an embodiment of an interface according to an aspect of the present invention.

Referring now to FIG. 1, an exemplary business engine 100 comprises a front end module 102, multiple instances of back end modules 104a-c, and a call coordinator interface 106. Typically, the call coordinator interface (CCI) 106 comprises a first element 106a associated with the front end module 102 and a number of second elements 106b associated with respective back end modules 104a-c. Usually, the CCI 106 is middleware.

The first element 106a of the CCI 106 comprises a data structure 108 that contains rules for 110 for governing to which of the back end modules 104a-c incoming data is assigned. The first element 106a also comprises a context server 112.

The front end module 102 comprises communication software that provides connectivity between the business software engine 100, external terminal 114 and servers 116a-c via a network 117. Typically, the network 117 comprises the Internet or a private network.

Typically, the back end modules 104a-c comprise business logic software that controls the generation of a resply to a user generated query received from a remote terminal 114.

In use, the front end module 102 receives data associated with a user query via a load balancing arrangement 115 in a manner that will be known to a man skilled in the art and passes the query to the first element 106a of the CCI 106.

Upon receipt of the query that first element 106a establishes a context for the query and stores a data entry associated with the query in the context server 112. For example, this context server data entry will comprise a session ID associated with the query that can be used to identify incoming and outgoing communications associated with the query or a global response time out parameter. A global time out parameter defines a length of time above which the whole query is deemed not to be fulfilled. Thus, if a response to the query is not supplied to the user within the time defined in the global response time out parameter a time out response is sent to the user via the terminal 114.

The first element 106a assigns the query to one of the back end modules 104a for processing according to the rules 110 stored in the data structure 108. Typical rules used to assign a query to a specific back end module include whether an instance of a back end module is suitable to handle the request, whether an instance of a back end module is free to handle the request, whether an instance of a back end module is operational, whether an SID has been established for a query.

The first element 106a then passes the query data to the second element 106b of the CCI 106. The second element 106b determines whether the back end module 104a with which it is associated is to run in either a single-shot or multiple shot mode. The query data passes to the back end module 104a via the second element 106b.

The back end module 104a determines which external servers 116a-c require interrogation in order to fulfil the user query. Data requesting the interrogation of the servers 116a-c passes to the second element 106b. The second element 106b may place a server specific response time out parameter into the interrogation data at this point. This interrogation data passes from the second element 106b to the first element 106a where additional context data, for example, whether server specific response time out data is present is stored in the context server 112 and in what mode the logic module 106 is operating. Once the interrogation data has passed to the front end module 102 the instance of the back end module 104a that generated the interrogation data is free to continue processing data. Data held within the first element 106a is updated to reflect this.

The interrogation data the passes to the front end module 102 that then interrogates the servers 116a-c according to the contents of the interrogation data.

The servers 116a-c process the data and return response data to the business engine 100 via the front end module 102.

Upon receipt of the response data at the front end module 102 the first element 106a are stores the response data in the context server 112 with an associated flag detailing the success of each interrogation of a server 116a-c. For example, the flag may denote that the interrogation of a server has timed out, has been successful or has failed at one of the communication layers.

The first element 106a identifies whether the instance of the back end module 104a that generated the interrogation data is operating in single or multiple shot mode. The first element 106a then identifies an instance of a back end module 104a-c that is suitable and free to process the response data. This may be the same back end module instance 104a that generated the interrogation data or it may be another instance of a back end module 104b,c. Typically, certain instances of back end modules are identical and are therefore interchangeable.

The first element 106a passes the response data along with the context data held on the context server 112 to the back end module 104a via the second element 106b.

If the back end module 104a is operating in single shot mode an aggregate data record containing data corresponding to all of the response data will pass to the back end module 104a.

However, if the back end module 104a is operating in multiple shot mode response data corresponding to the result of the interrogation of each server 116a-c will be returned to the back end module 104a.

The back end module 104a processes the response data and outputs reply data containing the answer to the user query to the remote terminal 114 via the first and second elements 106a,b, the front end module 102 and the network 118.

For example, if the business engine 100 is a travel booking engine and a user requests details of a flight from Berlin to Nice the front end communications module receives the request from the user terminal 113.

The request is passed to the CCI 106 first element 106a that assigns a session ID to the request and stores this in the context server 112. The first element 106a assigns the request to an instance of a back end module 104a-c.

For example, two of the back end module instances 104a,b may deal with flight bookings and the other back end module instance 104c may deal with hotel bookings. In this case, the first element 106a identifies that the hotel booking back end module instance 104c is inappropriate for sending the request to. One of the flight booking back end module instances 104b may be engaged in processing another request. Therefore, the first element 106a assigns the request to the available back end module instance 104a that deals with flight bookings.

The request is passed to the second element 106b of the CCI 106 and then onto the available flight booking back end module instance 104a. This processes the request in a known manner and outputs interrogation data requesting the interrogation of three airline servers 116a-c. The interrogation data passes through the CCI 106 via the second element 106b to the first element 106a. At the second element 106b flags are added to the interrogation data in order to denote whether the back end module instance 104a is operating in either single shot or multiple shot mode, and whether a server specific response time out parameter has been set.

The first element 106 extracts the flags from the interrogation data and stores it with the context data for the session as identified by the session ID in the context server 112.

The interrogation data passes to the communication front end module 102 from where the interrogation data is transmitted to the airline servers 116a-c via the network 117. The servers 116a-c are interrogated in a manner that is known to a person skilled in the art. Response data containing data relating to the availability and price of seats on the Berlin to Nice route is transmitted to the business engine 100 via the network 117.

The response data passes through the front end module 102 to the first element 106a of the CCI 106 where it is assigned to a suitable, free back end module instance 104a as described hereinbefore.

Should a global response time out parameter be defined at the first element 106a of the CCI 106 the request may be timed out if all of the response data is not received at the front end module 102 before the expiry of the time out period. If this occurs the front end module 102 generates notification data that passes to the back end module instance 104a. This then triggers a timeout reply sequence that results in a timeout message being routed by the front end module 102 to the user terminal 114 via the network 117.

The response data is passed to the back end module instance 104a that the front end module determined appropriate and free to use, either sequentially if the back end module instance 104a is operating in multiple shot mode or as an aggregate data record if it is operating in single shot mode. The response data is processed by the back end module instance 104a according to the business logic running within said instance 104a.

If the back end module instance 104a is operating in multiple shot mode and server specific time out is set any the failure of any one, or a specific, airline server 116a-c to respond within the time limit specified in the server specific response time out results in the output of reply data in which this time out failure is noted to the first element 106a. Typically, a server specific response time out parameter may be defined where a particular server is known to have a poor reliability record, is undergoing upgrade or any for any other reason.

If no response time out parameters are contravened the back end module instance 104a outputs reply data to the first element 106a.

The first element 106a passes any reply data to the front end module 102, which routes the reply data to the user terminal 114 via the network 117.

Figure 2:
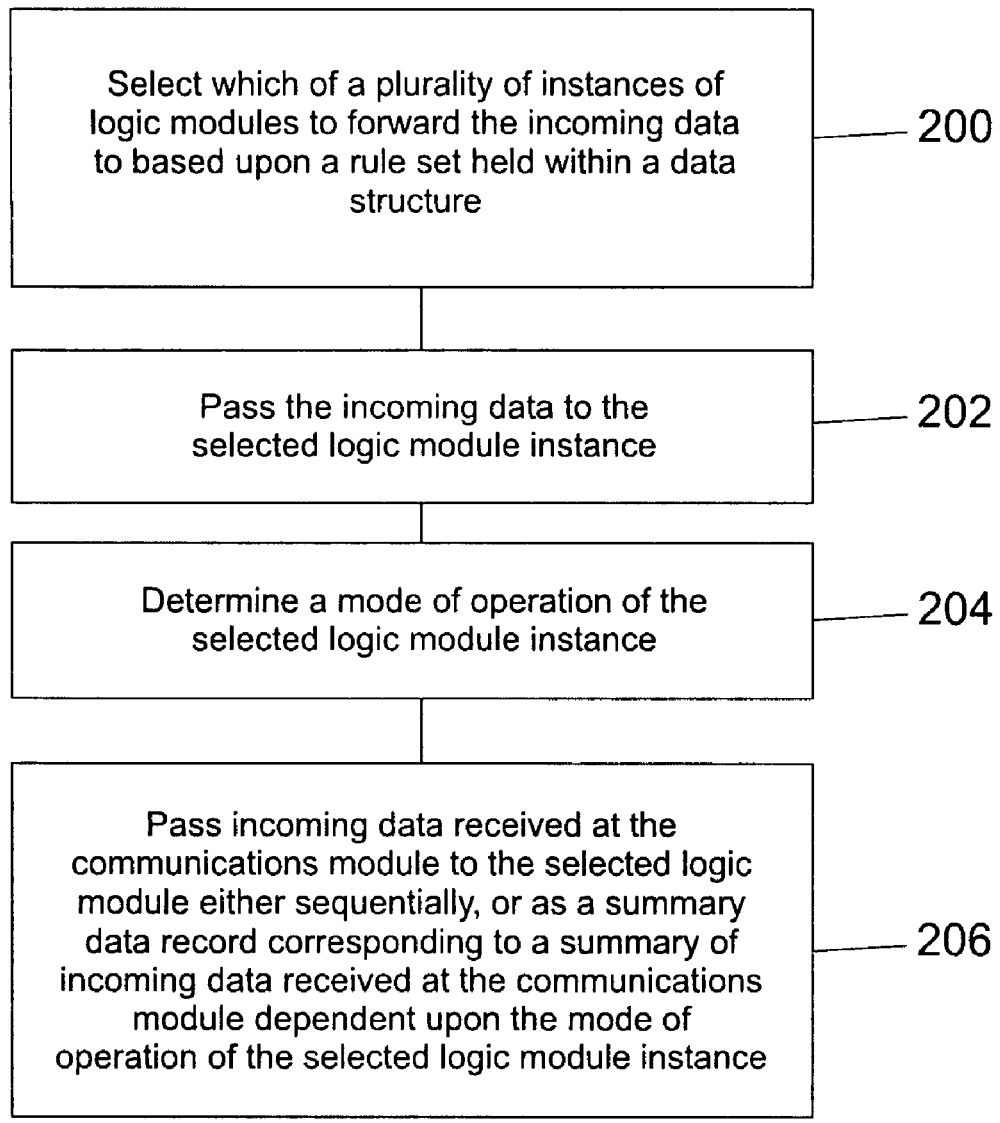
FIG. 2 is a flow chart detailing an embodiment of a method of interfacing between a communications module and instances of logic modules according to a further aspect of the present invention.

Referring now to FIG. 2, a method of interfacing between a communications module and instances of logic modules comprises selecting which of a plurality of instances of logic modules to forward the incoming data to based upon a rule set held within a data structure (Step 200). The incoming data passes to the selected logic module instance (Step 202). A mode of operation of the selected logic module instance is determined (Step 204). Incoming data received at the communications module is passed to the selected logic module either sequentially, or as a summary data record corresponding to a summary of incoming data received at the communications module. This depends upon the mode of operation of the selected logic module instance (Step 206).

It will be appreciated that although described with reference to travel data the present invention is suitable for use in any engine in which multiple instances of business logic, or any other logic, interact with a communication module that regulates the flow of data to and from the logic instances.

It will be further appreciated that although described with the first and second elements of the CCI as separate and associated with the front end module and instances of back end modules respectively the CCI may be a discrete system element with multiple instances of the second element running therein.

While various embodiments of the invention have been described, it will be apparent to those skilled in the art once given this disclosure that various modifications, changes, improvements and variations may be made without departing from the scope of the invention.

The invention claimed is:

1. An interface module executing within a computer system having at least one processor, for interfacing between a communications module and a plurality of instances of logic modules, the interface module being connectable with a plurality of external servers, the interface module comprising a first and a second functional elements, the first functional element being arranged to receive incoming data from the communications module and to select which of the plurality of instances of logic modules to forward the incoming data, wherein, responsive to a user request including query data, being received, the first functional element is arranged to:
   associate a context identifier to the received user request;
   select one of the plurality of instances of logic modules according to the assigned context identifier, based upon a set of rules held within a data structure:
   transmit via the second element the received query data to the selected logic module instance
   and wherein
   the selected logic module instance is arranged to determine which of the plurality of external servers must be queried to satisfy the user request and to communicate this information to the first element;
   the first element issuing a query to the determined external server, receiving response data from the queried external server and storing the received response data within the first functional element.

2. The interface module of claim 1, wherein the plurality of instances of logic modules can operate selectively in a single-shot or in a multi-shot mode, the second functional element being arranged to determine a mode of operation of the selected logic module instances and to mediate the passage of data between the selected logic module instance and the first functional element; and the transmission via the second functional element of the received query data to the selected logic is module instance is either sequential or corresponding to a summary data record corresponding summary of incoming data received dependent upon the mode of operation of the selected logic module instance.

3. The interface module of claim 1 wherein the data structure is stored at the first functional element.

4. The interface module of claim 1 wherein the first functional element is arranged to receive incoming query data from a remote terminal.

5. The interface module of claim 1 wherein the first functional element is arranged to store response data received from external servers.

6. The interface module of claim 1 wherein the first functional element is arranged to generate a summary data record from response data received from external servers and to transmit the summary data record to the selected logic module instance.

7. The interface module of claim 6 wherein the first functional element is arranged to transmit a summary data record to the selected logic module instance sequentially.

8. The interface module of claim 1 further comprising a context data structure.

9. The interface module of claim 1 wherein the context data structure comprises data entries corresponding to at least one of the following: assignment of logic modules to query data; global time out parameter associated with an instance of query data session identifier (SID) associated with each instance query data; specific response time out associated with an instance of interrogation of an external server.

10. The interface module of claim 1 wherein the first functional element is arranged to return a timeout datum to the second functional element if the time elapsed between interrogating an external server and receiving response data from the external server exceeds a threshold.

11. A computer implemented method of interfacing between a communication module and a plurality of instances of logic modules, the method comprising the steps of:
responsive to a user request, including query data, being received at the communication module, associating a context identifier to the user request;
selecting one of the plurality of instances of logic modules according to the assigned context identifier, based upon a set of rules held within a data structure;
transmitting the received query data to the selected logic module instance
the selected logic modules determining which of a plurality of external servers must be queried to satisfy the user request;
receiving response data from the queried external server and storing the received response, data.

12. A computer program including instructions for carrying out the steps of the method according to claim 11, when said computer program is executed on a computer.

13. A computer program product including non-transitory computer readable means embodying the computer program of claim 12.

* * * * *

UNITED STATES PATENT AND TRADEMARK OFFICE
CERTIFICATE OF CORRECTION

| | |
|---|---|
| PATENT NO. | : 7,802,258 B2 |
| APPLICATION NO. | : 11/705652 |
| DATED | : September 21, 2010 |
| INVENTOR(S) | : Jérome Daniel, et al. |

It is certified that error appears in the above-identified patent and that said Letters Patent is hereby corrected as shown below:

Column 6, Line 54, Claim 1 – change ":" to -- ; --

Column 6, Line 55, Claim 1 – between "second" and "element" insert -- functional --

Column 6, Line 61, Claim 1 – between "first" and "element" insert -- functional --

Column 6, Line 62, Claim 1 – between "first" and "element" insert -- functional --

Column 7, Line 7, Claim 2 – before "module" delete "is"

Column 7, Line 29, Claim 9 – change "claim 1" to -- claim 8 --

Column 8, Line 1, Claim 9 – between "data" and "session" insert -- ; --

Column 8, Line 2, Claim 9 – between "instance" and "query" insert -- of --

Column 8, Line 8, Claim 10 – between "a" and "threshold" insert -- predetermined --

Column 8, Line 24, Claim 11 – between "response" and "data" delete ","

Signed and Sealed this

Thirtieth Day of November, 2010

David J. Kappos
*Director of the United States Patent and Trademark Office*